US007308063B2

(12) United States Patent
Priotti

(10) Patent No.: US 7,308,063 B2
(45) Date of Patent: Dec. 11, 2007

(54) APPARATUS, AND ASSOCIATED METHOD, FOR EFFECTUATING POST-FFT CORRECTION OF FINE FREQUENCY OFFSET

(75) Inventor: Paolo Priotti, Yokohama (JP)

(73) Assignee: Nokia Corporation, Espoo (FI)

( * ) Notice: Subject to any disclaimer, the term of this patent is extended or adjusted under 35 U.S.C. 154(b) by 741 days.

(21) Appl. No.: 10/396,118

(22) Filed: Mar. 25, 2003

(65) Prior Publication Data

US 2004/0120410 A1  Jun. 24, 2004

Related U.S. Application Data

(60) Provisional application No. 60/434,977, filed on Dec. 20, 2002.

(51) Int. Cl.
 *H04L 7/04* (2006.01)
(52) U.S. Cl. .................. 375/362; 375/260; 375/354; 455/63; 370/491; 370/503
(58) Field of Classification Search ................ 375/354, 375/260; 455/63.1; 370/491, 503
See application file for complete search history.

(56) References Cited

U.S. PATENT DOCUMENTS

| | | | |
|---|---|---|---|
| 5,732,113 A | 3/1998 | Schmidl et al. | |
| 6,370,188 B1 | 4/2002 | Wu et al. | |
| 7,009,931 B2 * | 3/2006 | Ma et al. | 370/208 |
| 2002/0065047 A1 * | 5/2002 | Moose | 455/63 |
| 2002/0181509 A1 * | 12/2002 | Mody et al. | 370/480 |

FOREIGN PATENT DOCUMENTS

| | | |
|---|---|---|
| EP | 106705 A1 | 12/2000 |
| KR | 2000-0041863 A | 7/2000 |

OTHER PUBLICATIONS

List of publications from Takahiko Saba.*
Meng-Han Hsieh & Che-Ho Wei, IEEE 1999; A Low-Complexity Frame Synchronization and Frequency Offset Compensation Scheme for OFDM Systems over Fading Channels.

* cited by examiner

*Primary Examiner*—Temesghen Ghebretinsae
*Assistant Examiner*—Juan Alberto Torres
(74) *Attorney, Agent, or Firm*—Banner & Witcoff, Ltd.

(57) ABSTRACT

In an orthogonal frequency division multiplexing (OFDM) system, a receiver of an OFDM signal via an air interface defines training symbols to be included in the frame structure of the air interface and a post-FFT receiver algorithm that can efficiently estimate a fractional frequency offset (e.g., a frequency offset less than a single intercarrier spacing). The algorithm may be modified to estimate a large frequency offset (e.g., of more than a single intercarrier spacing) using increased hardware complexity. The algorithm does not need a correlator block in its simplest implementation. The frequency detection itself features excellent performance in a very low SNR environment. However, if noise plus timing error is present, system parameters may be designed to substantially assure good performance in low SNR.

16 Claims, 2 Drawing Sheets

APPARATUS, AND ASSOCIATED METHOD, FOR EFFECTUATING POST-FFT CORRECTION OF FINE FREQUENCY OFFSET

CLAIM OF PRIORITY

This application claims priority from U.S. Provisional Patent Application No. 60/434,977 entitled "Post-FFT Fine Frequency Offset Correction Algorithm With Extended Detection Range And Low Complexity" filed on behalf of Paolo Priotti on Dec. 20, 2002.

TECHNICAL FIELD

The invention relates generally to wireless communications and, more particularly, to an apparatus, and associated method, for correcting post-FFT fine frequency offset with extended detection range and low complexity.

BACKGROUND

In broadband wireless telecommunications, orthogonal frequency division multiplexing (OFDM) is a special case of multicarrier modulation (MCM), which is the principle of transmitting data by dividing the stream into several parallel bit streams and modulating each of these data streams onto individual carriers or subcarriers. Conventional OFDM systems utilize the Inverse Fast Fourier Transform (IFFT) and Fast Fourier Transform (FFT) to modulate and demodulate, respectively, information data.

OFDM systems are, however, susceptible to frequency offsets, which may result in a loss of orthogonality in the subcarriers and, as such, in Inter Carrier Interference (ICI). Such frequency offsets may result from a number of possible causes, including differences in the frequency of a transmitter and receiver due to local oscillator tolerance; Doppler shift due to the motion of mobile station and reflecting objects through a propagation path; and additive noise which may add instantaneous phase noise.

As OFDM transmission is heavily disturbed by the presence of a frequency offset, it is necessary to precisely correct the offset at the receiver. Many solutions to this problem are present in the literature and prior art, with processing that can be both in the time domain (pre-FFT) or in the frequency domain (post-FFT). In particular, the approach by Moose ("A Technique for Orthogonal Frequency Division Multiplexing Frequency Offset Correction", IEEE Transactions on Communications, Volume 42, Issue 10, Oct. 1994, Page(s): 2908-2914), proposes a post-FFT algorithm that is based on the repetition of a given training symbol. Such post-FFT algorithm can correct up to ±0.5 intercarrier spacings (also known as "subcarrier spacings") and needs at least two training symbols; however, the performance of the post-FFT algorithm is equivalent to pre-FFT algorithms based on cyclic prefix (CP) correlation, which can correct up to a maximum of ±0.5 intercarrier spacings. Typically, algorithms proposed in the prior-art for performing fine frequency offset correction are combined with a coarse frequency offset algorithm if the transmission system is specified for operation with a frequency offset larger than ±0.5 intercarrier spacings.

A study of the prior art shows that post-FFT processing is often used for detection of large frequency offsets, but is not often employed in fine frequency synchronization due to the presence of ICI.

Accordingly, a continuing search has been directed to the development of methods which may be utilized to effectuating post-FFT correction of fine frequency offsets.

SUMMARY

The present invention, accordingly, provides a method for effectuating post-FFT correction of fine frequency offset and, in particular, relates to algorithms used in receivers of OFDM-based systems. In accordance with principles of the present invention, training symbols are defined to be included in the frame structure of the air interface, and in a post-FFT receiver algorithm that can efficiently estimate a fractional frequency offset (e.g., of less than a single intercarrier spacing). The algorithm may be modified using more complex hardware to estimate a large frequency offset (e.g., of more than a single intercarrier spacing). The algorithm does not require a correlator block in its simplest implementation. With respect to immunity from noise, frequency detection itself features excellent performance in very low signal-to-noise ratio (SNR) environments. However, if noise plus timing error is present, then system parameters may be designed to substantially assure good performance in low SNR environments.

In one preferred embodiment of the present invention for performing post-FFT correction of fine frequency offset, an OFDM signal, having one or more training symbols, is transmitted on a portion of a regularly-spaced subcarrier of the OFDM signal, and the OFDM signal is converted, using an FFT, to the frequency domain. The pilot phase of the OFDM signal is compensated using the one or more training symbols, which training symbols correspond to one or more training symbols used in the generation of the OFDM signal. A fractional frequency offset of the OFDM signal is determined based on training symbols, and the OFDM signal is corrected according to the amount of fractional frequency offset determined. The post-FFT receiver algorithm may also be effectively employed in a Multiple-Input Multiple Output (MIMO) architecture. One advantage of the present invention is that it may incorporate a portion of the air interface, and not only the receiver algorithm.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
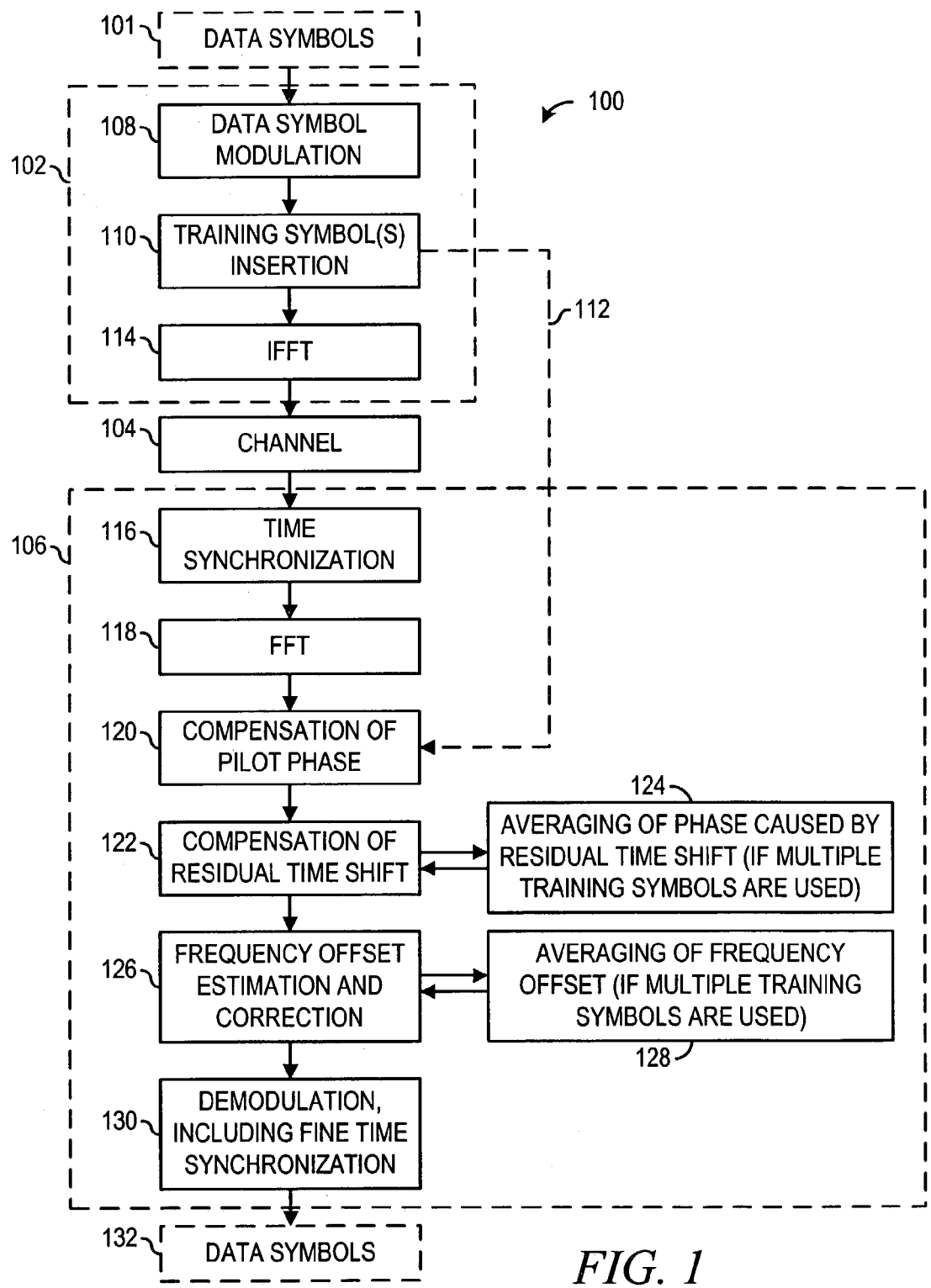
FIG. 1 is a high-level conceptual block diagram illustrating a wireless communications system embodying features of the present invention.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning wireless telecommunications, orthogonal frequency division multiplexing (OFDM), Fast Fourier Transforms (FFTs), and the like, have been omitted inasmuch as such details are not considered necessary to obtain a complete understanding of the present invention, and are considered to be within the skills of persons of ordinary skill in the relevant art.

It is noted that, unless indicated otherwise, functions described herein are performed by a processor such as a microprocessor, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

As mentioned above, the study of prior art has shown that post-FFT processing is often used for detection of large frequency offsets, but not often employed in fine frequency synchronization because of the presence of ICI. In accordance with principles of the present invention, ICI is limited by adopting training symbols where only a part of the subcarriers is used. Active subcarriers (referred to as pilot subcarriers herein) are regularly spaced, so that even in the presence of a frequency offset, the influence of nearby carriers is attenuated. The post-FFT phase of the subcarriers is directly proportional to the frequency offset, as demonstrated from the following steps.

Using the notation: $\Delta f = \Delta f_I + \Delta f_F = (n_I + \Delta f')1/T$, where $\Delta f_I$ is an integer offset (corresponding to an integer number of intercarrier spacings), $\Delta f_F$ is a fractional offset, and T is the symbol period (excluding the CP), then it may be shown that the output of the m-th bin of the FFT is given by:

$$y_m = X_{m-\Delta f_I} e^{j\pi \Delta f' \cdot \frac{N-1}{N}} \frac{\sin}{N\sin(\pi \Delta f_F/N)} + I_{ICI_m} + N_m,$$

where $I_{ICI_m}$ is due to ICI and $N_m$ is due to additive noise, as discussed in an article entitled "A Novel symbol synchronization algorithm with reduced influence of ISI for OFDM systems," IEEE 2001 Global Telecommunications Conference (GLOBECOM 2001), pp. 524-528, San Antonio, U.S.A., 2001-11.

In accordance with principles of the present invention, if the term due to ICT can be neglected, and disregarding the noise contribution, it may be readily shown that the only term that can influence phase is $$e^{j\pi \Delta f' \frac{N-1}{N}}.$$

Frequency offset up to $$\frac{N}{N-1}$$

intercarrier spacings (also known as "subcarrier spacings") may as such be estimated in the form of:

$$\hat{f}_{off} = \eta \frac{\sum_{l=0}^{P-1} \angle \tilde{R}_l(c_s + l\rho)}{P}$$

where $\eta$ is a constant, $\angle$ denotes the pilot phase, $c_s$ denotes the base pilot subcarrier, l denotes the $l^{th}$ non-zero pilot subcarrier, $\rho$ denotes the basic offset from the base pilot subcarrier, and P is the number of non-zero pilot subcarriers.

If $R_l$ are the pilot symbols after FFT processing, $\tilde{R}_l$ are the pilots processed as explained in the following description of the invention.

Referring to FIG. 1 of the drawings, the reference numeral 100 generally designates a high-level block diagram of a wireless telecommunications system embodying features of the present invention. The system 100 includes a transmitter 102 configured for communicating via a communication channel 104 to a receiver 106. The transmitter 102 and receiver 106 each comprise a number of modules having circuitry and related components, the design, development, and implementation details of which are considered to be apparent to a person having ordinary skill in the art based upon a review of the present description of the invention The transmitter 102 includes a modulation module 108 for receiving and modulating, in a conventional manner, one or more data symbols 101 to an OFDM signal in the frequency domain. A training symbol module 110 is connected to the modulation module 108 for inserting one or more training symbols k(t) into the frame structure of the modulated data symbols constituting the OFDM signal. In accordance with the present invention, the training symbol(s) k(t) are transmitted using only regularly spaced subcarriers, referred to herein as pilot subcarriers, to a post-FFT pilot phase shift compensation module 120, discussed further below, so that even in the presence of a frequency offset, the influence of nearby subcarriers is attenuated, due to an interval of unused subcarriers.

If the OFDM signal at the transmitter 102 is expressed in the time domain as:

$$x(t) = \frac{1}{N} \sum_{n=0}^{N} X(n) e^{j2\pi nt/N}$$

then the one or more training symbols k(t) generated by the training symbol module 110 are preferably determined as follows:

$$k_a(t) = \frac{1}{N} \sum_{n=0}^{N} X(n) e^{j2\pi nt/N} \quad \text{where}$$

$$X(n) = \begin{cases} \alpha \cdot e^{\frac{j2\pi(n-c_s)}{N}} & n = c_s, c_s + \rho, c_s + 2\rho \ldots \\ 0 & n = 0, 1, \ldots, c_s, c_s + 2, \ldots \end{cases}$$

otherwise α is a constant that regulates the amplitude of the time signal, and ρ and $c_s$ regulate the distribution of pilots inside the training symbols.

Alternatively, the training symbols k(t) may be determined as follows:

$$k_b(t) = \frac{1}{N} \sum_{n=0}^{N} x(N)e^{j2\pi n t/N} \quad \text{where}$$

$$X(n) = \begin{cases} K(l) \; l = 0, 1, \ldots & n = c_s + l\rho \\ 0 & n \text{ elsewhere} \end{cases}$$

K(l) is a low-PAPR code, such as, by way of example:

$K(l) = \alpha \cdot (1+j) \cdot (-1)^v$ v=0,1,0,1,1,0,1,1,0,0,0,0,

In a preferred embodiment, improved Peak-to-Average Power Ratio (PAPR) may be achieved by utilizing training symbols that constitute the periodic repetition on the frequency axis of, by way of example, the following sequences:

$K(l) = \alpha \cdot (1+j) \cdot (-1,-1,-1,-1,1,1,-1,1,1,-1,1,-1,1,-1)$ (length 14, PAPR=5.29 dB)

$K(l) = \alpha \cdot (1+j) \cdot (1,1,-1,-1,1,-1,1,-1,-1,1,1,1,1,-1,1,1,-1)$ (length 16, PAPR=4.85 dB)

Figure 2:
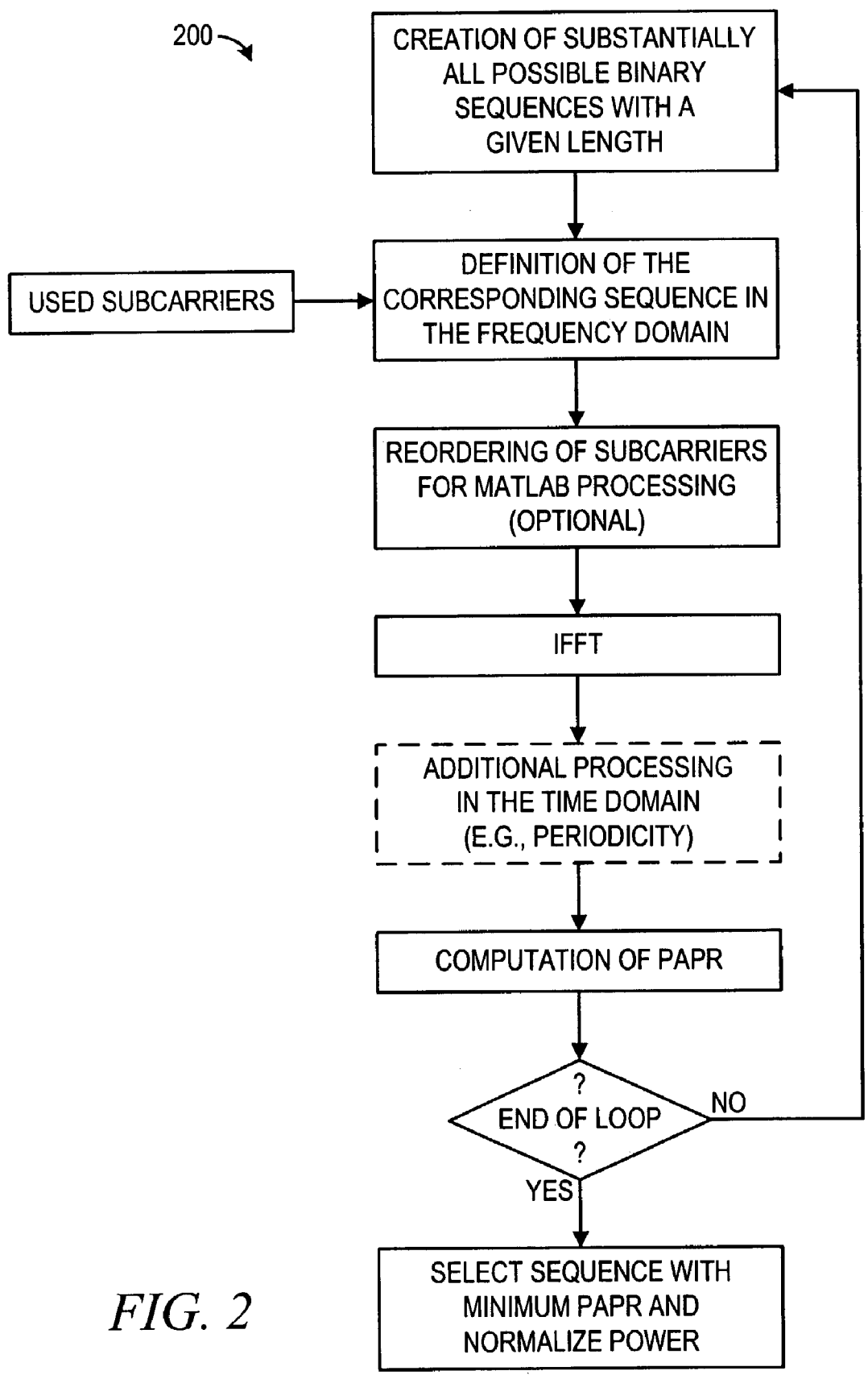
FIG. 2 is a flow chart illustrating logic embodying features of the present invention for specifying training sequences for computing training symbols.

Substantially optimal sequences may be specified for any number of subcarriers and pilot intervals, the logic of one of which is exemplified by the flow chart 200 depicted in FIG. 2. The training sequence depicted by the flow chart 200 generates a single training symbol; if there are multiple training symbols, then the complete training sequence may be built out of many identical symbols (put one after another) or different symbols. A number of training sequences different from that exemplified by FIG. 2 may be utilized, but are not discussed in further detail herein inasmuch as it is considered that a person having ordinary skill in the art could, without undue experimentation, develop such sequences upon a review of the present disclosure of the invention.

Referring back to FIG. 1, an inverse fast Fourier transforms (IFFT) module 114 is interconnected between the training symbol module 110 and the channel 104 for converting the OFDM signal from the frequency domain to the time domain for transmission over the channel 104.

The channel 104 preferably comprises conventional means for transmitting the OFDM signal from the transmitter 102 to the receiver 104. Such means may include, by way of example, antenna structures and related equipment for generating, transmitting from the transmitter 102, and receiving by the receiver 106 the OFDM signal over a radio frequency (RF) medium. Channels such as the channel 104 are considered to be well-known in the art and will, therefore, not be described in further detail herein, except insofar as necessary to describe the present invention.

On the receiver side of the channel 104, the receiver 106 includes a time synchronization module 116 configured for synchronizing in the time domain the receiver 106 with the frequency of the received OFDM signal. An FFT module 118 is connected to the synchronization module 116 for converting the OFDM signal from the time domain to the frequency domain. The modules 116 and 118 are considered to be well-known in the art and will, therefore, not be discussed in further detail herein.

In accordance with principles of the present invention, the post-FFT phase of the subcarriers is directly proportional to the frequency offset. A phase shift compensation module 120 is connected to the FFT module 118 for compensating the phase of the OFDM signal based on the pilot subcarrier values known to the receiver using, as indicated by the dashed line 112, the same training symbols used by the training symbol insertion module 110 of the transmitter 102. If $R_l$ are the pilot symbols after FFT processing, $\tilde{R}_l$ are the pilots processed by de-rotating the original pilot phase. Specifically, for $k_a(t)$:

$$\tilde{R}_l = R_l \cdot e^{-\frac{j2\pi(n-c_s)}{N}}$$

and for $k_b(t)$:

$$\tilde{R}_l = R_l \cdot e^{-j * \angle K(l)}$$

A residual time shift compensation module 122 is connected to the pilot phase compensation module 120 for compensating the residual time shift of the OFDM signal, and a phase averaging module 124 is operatively connected to the residual time shift compensation module 122. The module 122 is configured for determining whether the timing synchronization is non-perfect, resulting from the foregoing estimate of the mean phase rotation between two consecutive pilots, which estimate is relatively susceptible to noise, and also resulting in largely inaccurate fine time synchronization. If it is determined that there is non-perfect timing synchronization, the phase of all pilots is rotated by an amount proportional to the subcarrier index. This phase offset may be readily corrected by estimating the mean phase rotation between two consecutive pilots. In one preferred embodiment, the mean phase rotation between two consecutive pilots may be estimated using, by way of example, the following Matlab code:

```
% correction of timing offset
phase_accum = 0;
for aux = 2 : length (pilot_subc_idx)
    ph_diff = angle (rx_f_sig(pilot_subc_idx(aux-1))) - angle (rx_f_sig(pilot_subc_idx(aux)));
    if abs(ph_diff) > pi
        ph_diff = ph_diff-sign(ph_diff)*2*pi;   % phase ambiguity compensation
    end
    phase_accum = phase_accum + ph_diff;
end
```

-continued

```
phase_accum = phase_accum/(length (pilot_subc_idx) −1)/(det_range+1);
   for aux = 1 : length (pilot_subc_idx)
      rx_f_sig (pilot_subc_idx(aux)) = rx_f_sig
(pilot_subc_idx(aux))*exp(j*phase_accum*(pilot_subc_idx(aux) −1));
   end
```

Typically, it is not necessary to operate on the pilot symbol values, but only on the pilot symbol phases, so implementation of the invention may be readily achieved by additions and subtractions. For example, if the invention is implemented directly using pilot symbol phases, then phases may be added and subtracted without having to use complex exponential values.

If it is determined that the above estimate of the mean phase rotation between two consecutive pilots was made and that there is largely inaccurate fine time synchronization, then for proper operation in very low SNR, the above estimate of the phase rotation is preferably averaged over several training symbols, by the phase averaging module 124. This is, however, readily achieved and does not require buffering, it being sufficient to store a single value for every symbol.

A frequency offset estimation and correction module 126 is connected to the residual time shift compensation module 122 for further processing of the OFDM signal, and a frequency offset averaging module 128 is operatively connected to the module 126. In accordance with principles of the present invention, the phase shift compensation module 126 estimates the fractional frequency offset calculated according to the following equation:

$$\hat{f}_{off} = \eta \frac{\sum_{l=0}^{P-1} L\tilde{R}_l(c_s + l\rho)}{P},$$

where $\eta$ is a constant and P is the number of non-zero pilot subcarriers.

The frequency offset estimation and correction module 126 is also configured for determining whether the system 100 requires multiple training symbols and, if it does, then the module 126 is preferably configured to calculate the frequency offset for each training symbol, and the frequency offset averaging module 128 is configured to average the frequency offsets in the time domain, preferably without packet buffering. The frequency offset estimation and correction module 126 is configured for then correcting the frequency by the frequency offset, estimated with or without averaging.

A demodulation module 130 is connected to the frequency offset and estimation correction module 126 for demodulating the OFDM signal and, optionally, for fine time synchronization (further to the synchronization performed by the module 116), thereby generating data symbols 132 corresponding to the data symbols 101 received by the transmitter 102. The demodulation module 130 is connected for transmitting the data symbols 132 to conventional modules (not shown), well-known in the art, for further processing.

In operation, a stream of data symbols 101 are received into the transmitter 102. The data symbols 101 are modulated by the modulation module 108 to an OFDM signal in the frequency domain. Training symbols are added to the data symbols by the module 110, and the IFFT module converts the OFDM signal from the frequency domain to the time domain for transmission over the channel 104. The data symbols are then sent over the channel 104 to the receiver 106.

At the receiver 106, the time synchronization module 116 synchronizes in the time domain the receiver 106 with the frequency of the OFDM signal received from the transmitter 102 via the channel 104. The FFT module 118 converts the OFDM signal from the time domain to the frequency domain. The phase shift compensation module 120 then compensates the phase of the OFDM signal based on the pilot subcarrier values known to the receiver using, as indicated by the dashed line 112, the same training symbols used by the training symbol insertion module 110 of the transmitter 102.

The residual time shift compensation module 122 then determines whether there is non-perfect timing synchronization with the OFDM signal and, if there is, then the phase of all pilots is rotated by an amount proportional to the subcarrier index. The module 122 further determines whether there is largely inaccurate fine time synchronization and, if there is, then for proper operation in very low SNR, the amount of the phase rotation is preferably averaged, by the phase averaging module 124, over several training symbols.

The frequency offset estimation and correction module 126 then estimates the fractional frequency offset calculated according to the following equation:

$$\hat{f}_{off} = \eta \frac{\sum_{l=0}^{P-1} L\tilde{R}_l(c_s + l\rho)}{P},$$

where $\eta$ is a constant and P is the number of non-zero pilot subcarriers.

The frequency offset estimation and correction module 126 also determines whether the system 100 requires multiple training symbols and, if it does, then the frequency offset is calculated for each training symbol by the frequency offset estimation and correction module 126, and averaged in the time domain by the frequency offset averaging module 128, preferably without packet buffering. The frequency is then corrected by the frequency offset, whether estimated with or without averaging.

The OFDM signal is then demodulated by the module 130, and data symbols 132 corresponding to the data symbols 101 are transmitted to convention modules for further processing.

By the use of the present invention, particularly the algorithm discussed above with respect to the pilot phase compensation modules 126 and 128, a fractional frequency offset (e.g., a frequency offset of less than one intercarrier spacing) may be efficiently estimated. More specifically, a receiver's detection range is extended to $\pm(1-\epsilon)$ intercarrier spacings, compared to ±0.5 intercarrier spacings of prior art algorithms. If ICI is properly dealt with by appropriate training symbol design, then ε may be as little as 0.02. Systems like IEEE 802.11a require a correction of ±0.8 intercarrier spacings, so this algorithm would be sufficient for complete frequency synchronization. Depending on how a receiver is implemented, the algorithm of the present invention may also be less expensive to implement than other algorithms. The present invention also does not require a correlator block.

Furthermore, unlike prior art methods, the present invention does not require at least two training symbols, but may operate with a single training symbol. The use of multiple training symbols is optional, and has the only purpose of lowering the influence of noise through averaging.

Furthermore, the algorithm of the present invention requires only a minimum quantity of memory, and no packet buffering, even in the case of estimate averaging between several training symbols.

Still further, PAPR may be reduced to a reasonable level by adoption of properly conceived training symbols.

It is understood that the present invention may take many forms and embodiments. Accordingly, several variations may be made in the foregoing without departing from the spirit or the scope of the invention. For example, the algorithm utilized by the frequency offset estimation and correction modules 126 and 128 may be modified by reducing the offset to +/−0.5 intercarrier spacings via a correlator block interconnected between the FFT module 118 and the pilot phase compensation module 120, to thus estimate a large frequency offset (e.g., more than one intercarrier spacing). That is, if the detection range of the receiver is to be extended, then the algorithm utilized by the frequency offset estimation and correction modules 126 and 128 should be coupled, for example, with an algorithm that corrects offset multiples of the intercarrier spacing by finding the maximum of the correlation between the post-FFT training symbols and the original training symbols.

In another variation, the algorithm used by the frequency offset estimation and correction modules 126 and 128 may be effectively employed in number of products using OFDM modulation, such as Wireless Local Area Network (W-LAN) systems (e.g., IEEE 802.11a), a Multiple-Input Multiple-Output (MIMO) wireless system architecture (e.g., the frequency estimation portion of the synchronization system within a MIMO architecture), and the like. In yet another variation, the present invention may be implemented using different training symbols than those described herein.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method comprising:

receiving an OFDM signal having one or more training symbols transmitted on a portion of regularly-spaced subcarriers of the OFDM signal;

converting the OFDM signal, using an FFT, to the frequency domain;

compensating the pilot phase of the OFDM signal using said one or more training symbols, said one or more training symbols corresponding to one or more training symbols used in the generation of the OFDM signal;

determining a fractional frequency offset of the OFDM signal based on said one or more training symbols with reference to:

$$\hat{f}_{off} = \eta \frac{\sum_{l=0}^{P-1} \angle \tilde{R}_l(c_s + l\rho)}{P},$$

where $\eta$ is a constant, $\angle$ denotes the pilot phase, $\tilde{R}_l$ denoted the pilots processed by de-rotating the original pilot phase, $c_s$ denotes the base pilot subcarrier; index, l denotes the $l^{th}$ non-zero pilot subcarrier, $\rho$ denotes the basic offset from the base pilot subcarrier, and P is the number of non-zero pilot subcarriers; and correcting the OFDM signal according to the amount of fractional frequency offset without utilizing a correlation block.

2. The method of claim 1, further comprising the steps of:
determining whether the timing synchronization is non-perfect; and
upon a determination that there is non-perfect timing synchronization, rotating the phase of all pilots by an amount proportional to a subcarrier index.

3. The method of claim 1, further comprising the steps of:
determining whether the timing synchronization is non-perfect;
determining whether there is more than one training symbol; and
upon a determination that there is non-perfect timing synchronization and more than one training symbol, rotating the phase of all pilots by an amount proportional to a subcarrier index averaged over said more than one training symbols.

4. The method of claim 1, further comprising the step of demodulating the frequency-corrected OFDM signal to thereby generate data symbols.

5. The method of claim 1, further comprising the step of fine synchronization of the symbol timing.

6. The method of claim 1, wherein said method is adapted for at least one of a Wireless Local Area Network (W-LAN) and a Multiple-Input Multiple-Output (MIMO) wireless system architecture.

7. The method of claim 1, wherein said method is adapted for frequency estimation portion of a synchronization system within a Multiple-Input Multiple-Output (MIMO) wireless system architecture.

8. An apparatus comprising:
an FFT module configured for converting to the frequency domain, an OFDM
signal having one or more training symbols transmitted on a portion of regularly-spaced subcarriers of the OFDM signal;
a pilot phase compensation module connected to said FFT module for compensating a pilot phase of the OFDM signal using said one or more training symbols, said one or more training symbols corresponding to one or more training symbols used in the generation of the OFDM signal; and a fractional frequency offset and correction module connected to a pilot phase compensation module for determining a fractional frequency offset of the OFDM signal based on said one or more training symbols with reference to:

$$\hat{f}_{off} = \eta \frac{\sum_{l=0}^{P-1} \angle \tilde{R}_l(c_s + l\rho)}{P},$$

where η is a constant, ∠ denotes the pilot phase, $\tilde{R}_l$ denoted the pilots processed by de-rotating the original pilot phase, $c_s$ denotes the base pilot subcarrier; index, l denotes the $1^{th}$ non-zero pilot subcarrier, ρ denotes the basic offset from the base pilot subcarrier, and P is the number of non-zero pilot subcarriers, and correcting the OFDM signal according to the amount of fractional frequency offset without utilizing a correlation block.

9. The apparatus of claim 8, further comprising a residual time shift module interconnected between said pilot phase compensation module and said fractional frequency offset and correction module for determining whether the timing synchronization is non-perfect; and, upon a determination that there is non-perfect timing synchronization, for rotating the phase of all pilots by an amount proportional to a subcarrier index.

10. The apparatus of claim 8, further comprising a residual time shift module interconnected between said pilot phase compensation module and said fractional frequency offset and correction module for determining whether the timing synchronization is non-perfect and whether there is more than one training symbol; and, upon a determination that there is non-perfect timing synchronization and more than one training symbol, for rotating the phase of all pilots by an amount proportional to a subcarrier index averaged over said more than one training symbols.

11. The apparatus of claim 8, further comprising a demodulator connected to said fractional frequency offset and correction module for demodulating the frequency-corrected OFDM signal to thereby generate data symbols.

12. The apparatus of claim 8, further comprising a time synchronization module connected to said FFT module for fine synchronization of the symbol timing.

13. The apparatus of claim 8, wherein said apparatus is connected for use with at least one of a Wireless Local Area Network (W-LAN) and a Multiple-Input Multiple-Output (MIMO) wireless system architecture.

14. The apparatus of claim 8, wherein said apparatus is connected for use with a frequency estimation portion of a synchronization system within a Multiple-Input Multiple-Output (MIMO) wireless system architecture.

15. A computer-readable medium having computer-executable components comprising:
receiving an OFDM signal having one or more training symbols transmitted on a portion of regularly-spaced subcarriers of the OFDM signal;

converting the OFDM signal, using an FFT, to the frequency domain;
compensating the pilot phase of the OFDM signal using said one or more training symbols, said one or more training symbols corresponding to one or more training symbols used in the generation of the OFDM signal;
determining a fractional frequency offset of the OFDM signal based on said one or more training symbols with reference to:

$$\hat{f}_{off} = \eta \frac{\sum_{l=0}^{P-1} \angle \tilde{R}_l(c_s + l\rho)}{P}$$

where η is a constant, ∠ denotes the pilot phase, $\tilde{R}_l$ denoted the pilots processed by de-rotating the original pilot phase, $c_s$ denotes the base pilot subcarrier; index, l denotes the $1^{th}$ non-zero pilot subcarrier, ρ denotes the basic offset from the base pilot subcarrier, and P is the number of non-zero pilot subcarriers; and correcting the OFDM signal according to the amount of fractional frequency offset without utilizing a correlation block.

16. An apparatus comprising:
means for converting to the frequency domain, an OFDM signal having one or more training symbols transmitted on a portion of regularly-spaced subcarriers of the OFDM signal;
means for compensating a pilot phase of the OFDM signal using said one or more training symbols, said one or more training symbols corresponding to one or more training symbols used in the generation of the OFDM signal; and
means for determining a fractional frequency offset of the OFDM signal based on said one or more training symbols with reference to:

$$\hat{f}_{off} = \eta \frac{\sum_{l=0}^{P-1} \angle \tilde{R}_l(c_s + l\rho)}{P}$$

where η is a constant, ∠ denotes the pilot phase, $\tilde{R}_l$ denoted the pilots processed by de-rotating the original pilot phase, $c_s$ denotes the base pilot; subcarrier index, l denotes the $1^{th}$ non-zero pilot subcarrier, ρ denotes the basic offset from the base pilot subcarrier, and P is the number of non-zero pilot subcarriers, and correcting the OFDM signal according to the amount of fractional frequency offset without utilizing a correlation block.

* * * * *